March 7, 1961　　H. SCHEFTELOWITZ　　2,974,282
DEVICE FOR REPRESENTING A VOLTAGE IN THE SHAPE OF A CODE
Filed June 1, 1955　　2 Sheets-Sheet 1

INVENTOR
HENRI SCHEFTELOWITZ
BY Hame and Nydick
ATTORNEYS

March 7, 1961 H. SCHEFTELOWITZ 2,974,282
DEVICE FOR REPRESENTING A VOLTAGE IN THE SHAPE OF A CODE
Filed June 1, 1955 2 Sheets-Sheet 2

INVENTOR
HENRI SCHEFTELOWITZ
By Hane and Nydick
ATTORNEYS

United States Patent Office 2,974,282
Patented Mar. 7, 1961

2,974,282

DEVICE FOR REPRESENTING A VOLTAGE IN THE SHAPE OF A CODE

Henry Scheftelowitz, Stockholm, Sweden, assignor to Telefonaktiebolaget LM Ericsson, Stockholm, Sweden, a corporation of Sweden Filed June 1, 1955, Ser. No. 512,443

Claims priority, application Sweden June 18, 1954

1 Claim. (Cl. 324—99)

This invention relates to apparatus for representing an input voltage in the form of a code signal.

According to the present invention there is provided an apparatus for representing an input voltage in the form of a code signal, comprising first means for generating an auxiliary voltage in the form of pulses, second means for converting said pulses into a comparison voltage, the amplitude of which increases in a step-wise manner and increases in synchronism with said pulses, third means for comparing the instantaneous value of said comparison voltage with the instantaneous value of said input voltage and for effectively preventing the generation of said pulses when said value of said comparison voltage exceeds a critical value dependent on said value of said input voltage, electronic switching means operable by said pulses and having a plurality of outputs for delivering, in seriatim, a voltage, a voltage being delivered from each one of said outputs in synchronism with each one of said pulses, fourth means associated with said outputs and responsive to voltages at said outputs for providing code signals in dependence on which the outputs deliver a voltage, the arrangement being such that during operation of said apparatus said comparison voltage increases until the value thereof exceeds said critical value so that one particular output of said plurality of outputs delivers a voltage to said fourth means, a code signal thereby being provided which corresponds to a range of values which includes said instantaneous value of said input voltage, whereby the latter is represented in the form of a code signal.

Figure 1:
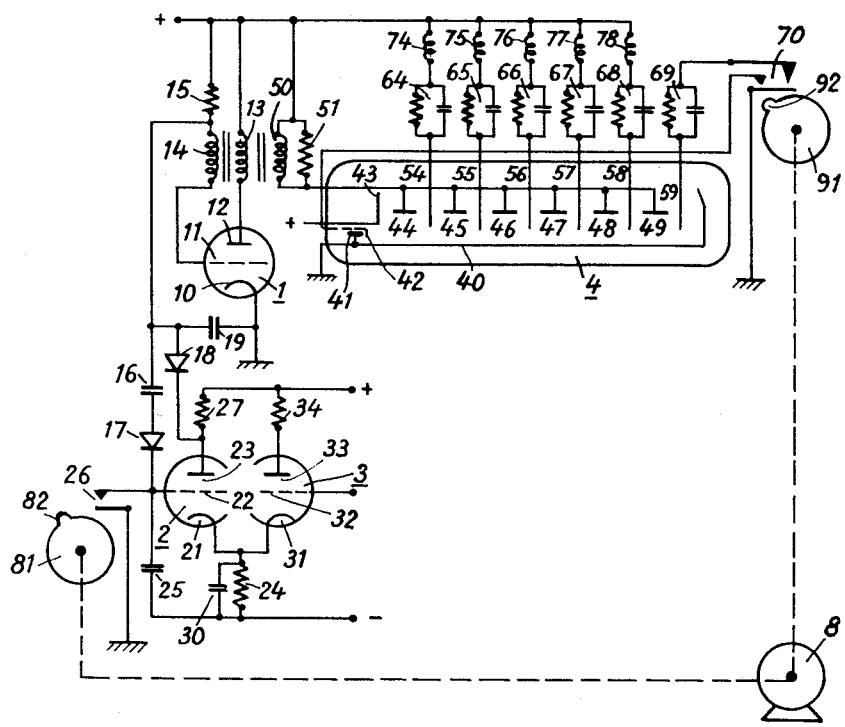
Figure 2:
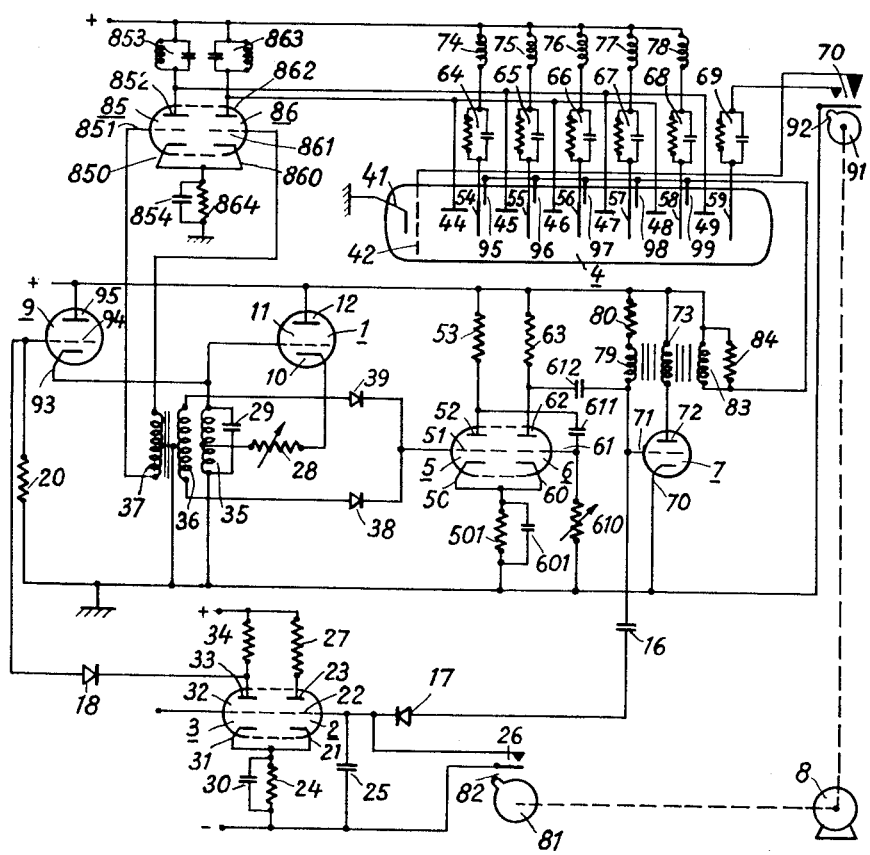

For a better understanding of the invention and to show how the same may be carried into effect, reference will now be made to the accompanying drawings in which:

Figs. 1 and 2 show electric circuitry.

Referring now to the drawings, in Fig. 1, 1 is a source of auxiliary voltage in the form of a triode having a cathode 10, a control grid 11 and an anode 12. The cathode 10 is directly grounded, the control grid 11 is, over a transformer 13—14—50 and a resistance 15, connected to a source of anode voltage, to which the anode 12 is connected over a winding 13 in the transformer 13—14—50. The source of anode voltage constitutes the primary voltage and is indicated by the plus sign in the upper left hand corner of Fig. 1. The point of connection between the winding 14 and the resistance 15 is connected to the cathode 10 over a condenser 19 to a control grid 22 in a triode 2 over a condenser 16 and a rectifier 17 and to an anode 23 in the same triode over a rectifier 18. The auxiliary voltage source and the components associated therewith thus constitute a self-blocking oscillator. The triode 2 has a cathode 21 connected to a source of negative bias voltage over a resistance 24 which is connected in parallel with a condenser 30, the previously mentioned control grid 22, which is connected to the source of negative bias voltage over a condenser 25 and which can be connected to ground over a make-contact 26, and the aforesaid anode 23, which is connected to a source of positive bias voltage over a resistance 27. The source of negative bias voltage is indicated by the minus sign in Fig. 1. The triode 2 forms together with the triode 3 an amplitude comparing device, more exactly a differential amplifier. The triode 3 has a cathode 31, which is directly connected to the cathode 21, a control grid 32 to which an input or measuring voltage is to be applied, and an anode 33, connected over a resistance 34 to the same source of anode voltage as the triode 2.

An electronic stepping device 4 in the form of a trochotron is provided with a cathode 41, a grid 42, an anode 43, a bar 40, plates 44–49 and spades 54–59. The term "trochotron" has been accepted as a generic term for electronic tubes in which the electron beam performs a trochoidal or helical movement. Such tubes are well known in the art and described for instance in U.S. Patent 2,513,260. The cathode 41 and the bar 40 are directly grounded, the grid 42 is connected to a fixed contact element in a make-contact 70, and the anode 43 is connected to a source of anode voltage. The plates 44–49 are connected to the same source of anode voltage as the triode 1 over a parallel connection of the winding 50 and a resistance 51 and the spades 54–58 are connected to the same source of anode voltage each over a parallel circuit 64–68 consisting of a resistance and a condenser in series with a coil 74–78. The coils 74–78, with the circuits 64–68, serve as testing means and each coil with the associated circuit has a long time constant compared with the stepping speed of the trochotron. The space 59 is connected to a second fixed contact element in the make-contact 70 over a parallel connection 69 of a resistance and a condenser. The movable contact element is connected to ground, and the whole make-contact is arranged so that at contact make the spade 59 remains grounded a little long than the grid 42. The make-contacts 26 and 170 serve as zero position means and are arranged to be closed by rotating discs 81 and 91, each of which is provided with a projection 82 and 92, the discs being synchronously driven by means of a motor 8.

The apparatus just described in the preceding functions in the following manner: The measuring voltage, which is to be transmitted in the form of a code, is applied to the control grid 32 in the triode 3. Before that the control grid 22 in the triode 2 has momentarily been grounded over the make-contact 26 by the projection 82 having operated the movable contact element in the make-contact at rotation of the disc 81. Provided the operation is consistent it does not matter whether or not this grounding of the grid causes the triode to be cutoff. On application of the measuring voltage the triode 3 carries most (or all) of the current flowing through the parallel-connected triodes 2 and 3. Assuming that the anode current to the anode 12 increases, the potential on the grid 11 will also increase due to the inter-action of the windings 13, 14. This increase of potential on the grid 11 causes the anode current to increase further, which in turn causes a further increase on the grid 11, and so on, until the potential on the grid 11 reaches a value such that grid current flows and hence reduces the anode current. This reduction of anode current causes a reduction of grid potential and so on until grid current ceases to flow which causes an increase in anode current so that the foregoing cycle of events is repeated. Thus a train of negative and positive pulses is generated each having the same energy content, the train being fed over the condenser 16 and rectifier 17 to the condenser 25. The rectifier prevents the negative pulses reaching the condenser 25 and the latter is charged in a step-wise manner. Thus the potential on the grid 22 also increases in a step-wise manner. The pulses are also fed via the windings 13, 50 to the plates of the trochotron 4, where in known manner they cause the electron beam of the trochotron to step from box to box beginning in box 59. When the stepped voltage on the control grid 22 amounts to or possibly surpasses somewhat the amplitude of the measuring voltage, the triode 2 become sufficiently energized to carry the main part of the current of the two triodes connected in parallel so causing the voltage on the anode 23 to decrease, the rectifier 18 to conduct and the source 1 of auxiliary voltage to be locked, which means that the generation of pulse-shaped voltage ceases. The stepping of the electron beam in the trochotron 4 therewith also ceases, and the electron beam thus remains in a box corresponding to the amplitude of the measuring voltage. During stepping negative pulses arise on the corresponding spaces owing to the parallel circuits 64–68, but during the stepping itself these pulses have such a short duration that a test device (not shown on the drawing) which is to be operated by the windings 74–78, has not time to be operated. As already mentioned, the time constant of the coils 74–78 with the circuits 64–68 is long compared with the stepping speed of the trochotron. When the electron beam remains in a box, the negative pulse on the corresponding spade is given a long duration, due to which the test device has time to be operated and to give some kind of signal in the form of a code. After the measuring voltage thus having been transformed into a suitable code, the device is returned to zero by the make-contacts 26 and 70 being automatically closed at rotation of the discs 81 and 91, and the device is ready for a further transformation of the instantaneous amplitude of the measuring voltage into the code, a transformation thereby being effected for every revolution of the motor 8. The circuit 69 is provided for giving the spade 59 a definite potential after the contact 70 is opened. Without this circuit the spade may adopt any potential within a range around ground potential.

The device according to Fig. 2 is similar to that already described and is provided with a triode 1, an amplitude comparing unit 2—3, an electronic stepping device 4 and a zero return device 26—70. In the following some differences of the two devices will be pointed out.

The triode 1 is arranged to emit a sinusoidal voltage to a balanced transformer 35—36—37. The cathode 10 is connected over a variable resistance 28 to a central tapping on a winding 35 in the transformer 35—36—37, the control grid 11 is connected to one of the ends of the winding 35, and the anode 12 is directly connected to a source of auxiliary voltage. A condenser 29 is connected in parallel with the winding 35. A winding 36 in the transformer 35—36—37 feeds two rectifiers 38 and 39 connected in series and with reverse polarity, the connection point for these elements being connected to a control grid 51 in a triode 5. The control grid 51 being connected to ground via a resistor 510. The central tapping of the winding 36 as well as one of the terminals of the winding 35 is directly grounded. The triode 5 has a cathode 50 which is grounded over a resistance 501 connected in parallel with a condenser 601, the aforementioned control grid 51 and an anode 52, which is connected on the one hand to a source of anode voltage over a resistance 53, and on the other hand to a control grid 61 in a triode 6 over a condenser 611. The triode 6 has a cathode 60, which is directly connected to the cathode 50, the aforesaid control grid 61, which is grounded over a variable resistance 610 and an anode 62, which is connected on the one hand to the resistance 53 over a resistance 63, and one the other hand to a control grid 71 in a triode 7 over a condenser 612. The triode 7 has a cathode 70, which is directly grounded, the aforesaid control grid 71, which is connected to the control grid 22 in the amplitude comparing unit 2—3 over the condenser 16 and the rectifier 17 and an anode 72, which is connected to resistance 63 over a winding 73 in the transformer 79—73—83 and to the control grid 71 over the winding 73, a resistance 80 and a winding 79 in the transformer 79—73—83. A winding 83 in the transformer 79—73—83, connected in parallel with a resistance 84, connects the winding 73 with by-spades 95—99, one in each box, in the electronic stepping device 4. The plates 44, 46 and 48 in said stepping device are interconnected and connected to the anode 862 in a triode 86. The places 45, 47 and 49 are interconnected and connected to an anode 852 in a triode 85. The triode 85 comprises a cathode 850, connected to ground over a resistance 864 and a condenser 854 connected in parallel with said resistance, a control grid 851 connected to one of the terminals on a winding 37 in the transformer 35—36—37, and the aforesaid anode 852, which is connected to a source of anode voltage over a parallel circuit 853 consisting of an inductance and a condenser. The triode 86 comprise a cathode 860, a control grid 861 connected to the other terminal of winding 37, and the aforesaid anode 862, which is connected to the same source of anode voltage as the anode 852 over a parallel circuit 863, consisting of an inductance and a condenser. In the amplitude comparing unit the anode 33 is over the rectifier 18 connected to a control grid 94 in a triode 9, which furthermore has a cathode 93 connected to the control grid 11 and an anode 95 connected to the anode 12. The control grid 94 is grounded over a resistance 20.

The device shown in Fig. 2 functions in the following manner: A measuring voltage, which is to be transformed into a code, is applied to the control grid 32 in the amplitude comparing unit 2—3. The source of auxiliary voltage consisting of the triodes 1, 5 and 6 is arranged to emit a pulse-shaped voltage on the one hand to the rectifier 17 in the amplitude comparing unit, and on the other hand to the by-spades 95–99 in the electronic stepping device 4. The electron beam in the stepping device 4 is thereby caused to step from box to box, simultaneously with the voltage over the condenser 25 increasing in a step-wise manner. When the voltage reaches the amplitude of the measuring voltage, the triode 2 becomes energized, the voltage on the anode 33 increases, the voltage on the control grid 94 in the triode 9 increases, the triode 1 is suppressed and stops oscillating, and the electron beam in the stepping device 4 is made to stop in that box, in which it happens to be at that moment. Testing means, not shown, are thereby operated by the test-windings 74—78 corresponding to said box, and the transformation into code is thus effected.

The triode 1 generates a sinusoidal voltage. Via the winding 37 a positive potential is therefore transmitted to grid 861 at the same time as a negative potential is transmitted to the grid 851 and vice versa. The tubes 85 and 86 are connected in parallel and are conducting every second time. The plates 44, 46 and 48 are connected to the anode of the tube 86, and the plates 45, 47 and 49 are connected to the anode of the tube 85. With the help of the potentials thus appearing in the tube 4 and the potentials transmitted to the units 95–99 vis the tube 7 the electron beam in valve 4 is influenced to switch from box to box. The tubes 5 and 6 are connected in parallel. As mentioned before the tube 1 generates a sinusoidal voltage; a positive half period of this voltage is transmitted via 39 to the grid 51 and then the tube 5 conducts with the result that a negative impulse from its anode 52 is transmitted via capacitor 611 to the grid 61 in tube 6. With grid 61 negative (or less positive than before) a positive impulse is transmitted via capacitor 612 to grid 71 in tube 7 (causing an amplified inpulse to the units 95–99) and to grid 22 in tube 2. The next half period of the sinusoidal voltage from tube 1 is transmitted as a positive voltage to grid 51 and so on.

What I claim is:

A device for producing a measuring voltage in the form of a code comprising, in combination, a source of auxiliary voltage generating a pulse-shaped output voltage, amplitude comparing means connected in circuit with said voltage source for feeding the comparing means with said pulse-shaped voltage, said comparing means generating a comparison voltage having a step-wise increasing amplitude and being arranged to block said voltage source in response to a comparison voltage above a predetermined value controlled by the measuring voltage, electronic stepping means including electrodes defining several boxes in a row array and having an electron beam arranged to step from box to box in time with incoming pulses of said pulse-shaped voltage, said stepping means being connected in circuit with said auxiliary voltage source for feeding said pulse-shaped voltage to the stepping means also, circuit means for feeding the measuring voltage to said comparing means and test-circuit means connected in circuit with said electrodes and arranged to transform the momentary amplitude of the measuring voltage into the desired code form, said test circuit means having a reaction time longer than the duration of the pulses controlling the stepping of the electron beam, said auxiliary source of voltage including a first, a fourth and a fifth electron tube, each having a control grid, said electronic stepping means including a trochotron including plates and auxiliary dividers, and said amplitude comparing means including a second and a third electron tube, each including a control grid and connected in push-pull, the said first tube being connected to the control grid of said fourth tube, said fourth tube being connected in a push-pull circuit with the fifth tube, said fifth tube being connected in circuit with the control grid of said second tube, said circuit including a rectifying means, and said fifth tube being further connected in circuit with said auxiliary dividers of said trochotron, said last mentioned circuit including a sixth electron tube, and said comparing means further including a seventh electron tube having a control grid, the anode of the third tube being connected in circuit with the grid of said seventh tube, said last mentioned circuit including a second rectifying means, the cathode of the seventh tube being connected to the control grid and the anode of the said tube to the anode of the first tube.

References Cited in the file of this patent
UNITED STATES PATENTS

| | | |
|---|---|---|
| 2,451,044 | Pierce | Oct. 12, 1948 |
| 2,497,961 | Shaw | Feb. 21, 1950 |
| 2,529,666 | Sands | Nov. 14, 1950 |
| 2,632,147 | Mohr | Mar. 17, 1953 |
| 2,676,253 | Ayres | Apr. 20, 1954 |
| 2,717,994 | Dickinson et al. | Sept. 13, 1955 |
| 2,722,660 | Jones | Nov. 1, 1955 |
| 2,733,358 | Carapellotti | Jan. 31, 1956 |
| 2,840,806 | Bateman | June 24, 1958 |